US 9,612,171 B2

(12) United States Patent
Meuter et al.

(10) Patent No.: US 9,612,171 B2
(45) Date of Patent: Apr. 4, 2017

(54) TORQUE-MEASURING SHAFT (71) Applicant: ATESTEO GMBH, Alsdorf (DE)

(72) Inventors: Herbert Meuter, Herzogenrath (DE);
Marcel Clermont, Baesweiler (DE);
Ralf Lanfermann, Cologne (DE)

(73) Assignee: ATESTO GmbH, Alsdorf (DE)

( * ) Notice: Subject to any disclaimer, the term of this patent is extended or adjusted under 35 U.S.C. 154(b) by 0 days.

(21) Appl. No.: 14/933,222

(22) Filed: Nov. 5, 2015

(65) Prior Publication Data

US 2016/0131543 A1 May 12, 2016

Related U.S. Application Data (60) Provisional application No. 62/081,677, filed on Nov. 19, 2014.

(30) Foreign Application Priority Data

Nov. 6, 2014 (DE) .................. 10 2014 016 295

(51) Int. Cl.
*G01L 1/22* (2006.01)
*G01L 3/10* (2006.01)
(52) U.S. Cl.
CPC .................. *G01L 3/108* (2013.01)
(58) Field of Classification Search
CPC .............................. G01L 3/105; G01L 3/108
USPC ........... 73/872.08, 962.338, 862.338, 862.08
See application file for complete search history.

(56) References Cited

U.S. PATENT DOCUMENTS

| 3,823,608 A * | 7/1974 | Pantermuehl ........... G01L 3/105 |
| | | 73/862.322 |
| 7,093,477 B2 | 8/2006 | Herbold et al. |
| 8,250,935 B2 | 8/2012 | Meuter |
| 8,627,730 B2 | 1/2014 | Valov et al. |
| 8,991,267 B1 * | 3/2015 | Kenney ................... G01L 3/108 |
| | | 73/862.338 |
| 2002/0050177 A1 | 5/2002 | Honjo |
| 2010/0162830 A1 | 7/2010 | Meuter et al. |
| 2011/0005340 A1* | 1/2011 | Jeon ........................ B62D 6/10 |
| | | 73/862.193 |
| 2012/0144933 A1* | 6/2012 | Nold ..................... G01L 3/1457 |
| | | 73/862.321 |

FOREIGN PATENT DOCUMENTS

| AT | 508 740 B1 | 3/2011 |
| DE | 35 28 364 A1 | 2/1987 |
| DE | 250 996 A1 | 10/1987 |

(Continued)

OTHER PUBLICATIONS

German Search Report in DE 10 2014 017 410.7, dated Oct. 2, 2015, with English translation of relevant parts.

*Primary Examiner* — Max Noori
(74) *Attorney, Agent, or Firm* — Collard & Roe, P.C.

(57) ABSTRACT

A torque-measuring shaft includes a measuring shaft disposed on a shaft axis of the torque-measuring shaft, loadable in torsion and having at least one rotationally symmetric surface region disposed coaxially with the shaft axis as well as a measuring device disposed on the measuring shaft for measuring a torsion of the measuring shaft, wherein the torque-measuring shaft has a material weakening disposed in radial direction inside the measuring shaft, eccentrically relative to the shaft axis.

25 Claims, 2 Drawing Sheets

(56) References Cited

FOREIGN PATENT DOCUMENTS

| | | |
|---|---|---|
| DE | 40 09 286 A1 | 9/1991 |
| DE | 195 25 231 A1 | 1/1997 |
| DE | 40 09 286 A1 | 9/1997 |
| DE | 196 40 717 A1 | 4/1998 |
| DE | 199 36 293 A1 | 2/2001 |
| DE | 202 09 850 U1 | 9/2002 |
| DE | 10 2007 005 894 A1 | 12/2007 |
| DE | 10 2008 028 826 A1 | 12/2009 |
| DE | 20 2010 005 613 U1 | 9/2010 |
| DE | 10 2010 034 638 A1 | 9/2011 |
| DE | 10 2011 116 561 A1 | 9/2012 |
| DE | 10 2012 024 264 A1 | 6/2014 |
| WO | 2009/155049 A2 | 12/2009 |

\* cited by examiner

TORQUE-MEASURING SHAFT

CROSS REFERENCE TO RELATED APPLICATIONS

This application is a non-provisional application that hereby claims priority under 35 U.S.C. 119 from German Application No. 10 2014 016 295.8 filed Nov. 6, 2014 and under 35 U.S.C. 119(e) from U.S. Provisional Patent Application Ser. No. 62/081,677 filed Nov. 19, 2014, the disclosures of which are incorporated herein by reference.

BACKGROUND OF THE INVENTION

1. Field of the Invention

The invention relates to a torque-measuring shaft comprising a measuring shaft disposed on a shaft axis of the torque-measuring shaft, loadable in torsion and having at least one rotationally symmetric surface region disposed coaxially with the shaft axis as well as measuring means disposed on the measuring shaft for measuring a torsion of the measuring shaft.

2. Description of the Related Art

Torque-measuring shafts of the class in question are already known from the prior art.

For example, US 2002/0050177 A1 discloses a torque-measuring detector integratable in a drive-shaft train. The detector has a first torque-detector part comprising a sensor for the detecting of torsions and a second torque-detector part comprising a sensor for the detecting of torsions smaller than are detectable with the first torque-detector part, in order to be able to measure even smaller torques effectively and reliably.

From DE 10 2010 034 638 A1, a torque-measuring shaft is known with a first measuring region with a high sensitivity as well as a low torsional stiffness and with a second measuring region with a low sensitivity as well as a high torsional stiffness. For the increase of the torsional stiffness, this torque-measuring shaft further comprises spring elements disposed in alignment with a central measuring bar and stops therefor, wherein these spring elements are able to be braced against the stops during increasing torsion of the torque-measuring shaft, in order to increase the torsional stiffness of the torque-measuring shaft, thus permitting a high measuring sensitivity with a broad bandwidth.

Furthermore, from DE 10 2011 116 561 A1, a torque-measuring shaft is known with a torsion member disposed between two flanges. The torsion member is formed with differing thickness in the direction of its longitudinal extent and has a first and a second measuring zone. Both the first measuring zone and also the second measuring zone are loadable over the entire loading range of the torque-measuring shaft with a torque applied between the flanges. In this way, the various measuring zones can be structurally realized more simply.

In DD 250 996 A1, a multi-stage torque-torsion converter for torque-measuring devices is described, by means of which different measuring ranges are supposed to be adjusted. For this purpose the multi-stage torque-torsion converter has a torsion unit and a torsionally stiff coupling unit, wherein the torsion and coupling units are actively connected to one another by means of coupling claws at one end and are formed to be longitudinally positionable relative to one another by means of a spacing sleeve at the other end.

DE 35 28 364 A1 discloses a reaction-torque transducer in the form of a torsion tube loadable in torsion, which is bounded by two flanges. The reaction-torque transducer further has, mounted on the torsion tube, an electro-mechanically acting converter system, which consists substantially of strain gauges mounted symmetrically on the torsion tube. A circumferential recess is formed on the inside of the torsion tube in the region of the active part of the grid of the strain gauges. With this circumferential recess it is intended to ensure that the torsion tube is weakened only in the region destined for the converters.

Furthermore, from DE 40 09 286 A1, a measuring element with a flatly shaped strain-gauge array of at least one metallic strain gauge and associated metallic contact faces is known, which is characterized by a flat diaphragm, which is formed in one piece with a thickened flange, oriented along the rim of the diaphragm, which serves for the fastening of the measuring element to a member, the torsion of which is to be measured, wherein the strain-gauge array is firmly mounted on one side of the diaphragm.

DE 195 25 231 A1 discloses a torque sensor with two flanges disposed at axial spacing, wherein the flanges are joined to one another via several axially extending webs and wherein the webs have shearing-force measured-value transducers in the form of strain gauges. These webs have at least one face resting substantially on a common cylinder face coaxial with the flanges, wherein the strain gauges are disposed on this face. The torque sensor is intended to combine a good measuring accuracy with a high insensitivity toward interfering forces.

From DE 199 36 293 A1, a torque sensor is known with a first and a second flange, which are spaced axially apart from one another and which are joined to one another via a torque-transmitting element, wherein the torque-transmitting element has weakened regions, which possess, coaxially with the flanges, at least one common shell surface, on which shearing-force measured-value transducers are disposed. The torque-transmission element has a closed tubular portion connecting the flanges, whereby the torque sensor has a compact construction.

DE 10 2007 005 894 A1 describes a torque-measuring flange with a substantially cylindrical measuring region, in which measuring recesses are disposed, and with measured-value transducers, which measure stresses and/or strains in the measuring region, wherein at least two measuring recesses are shaped differently, whereby several higher or several differently resolved measuring regions can be provided with a single torque-measuring flange.

Furthermore, from DE 10 2008 028 826 A1, a torque-measuring device with a torque-measuring flange and an evaluating unit is known, in which the evaluating unit has means for the storage of a variable proportional to a free-wheel torque and means for the compensation for a measured value with the stored variable, in order to minimize in particular the measurement of artifacts.

Furthermore, the disclosure of DE 196 40 717 A1 shows a torsionally stiff torque-measuring hub for the static and dynamic sensing of torques. This torque-measuring hub consists substantially of two rotationally symmetric disks, which at their circumference are joined frictionally to one another with largest possible spacing R from the axis of rotation by axially aligned force transducers. The force transducers are dimensioned for the sensing of shearing tangential forces.

In addition, WO 2009/155049 A2 also teaches a torque transmitting and monitoring device with a first and a second flange part for the arrangement of the torque, transmitting and monitoring device in a drive train, wherein the two flange parts spaced apart from one another by a gap are joined to one another with a middle part. On the shell surfaces of the two flange parts, a cylindrical band bridging over the gap is disposed which circumferentially has a toothing, the individual teeth elements of which change relative to one another upon a torsion of the middle part and a relative shift of the two flange parts resulting therefrom. These changes are detected by a sensor provided further outward radially, whereby the stronger of the torques can be determined.

In the torque-measuring shafts mentioned in particular in the foregoing, it is disadvantageous that they either have a relatively complex constructive structure and/or are not suitable for use into a high-speed range of extremely small rotating shafts or the like.

SUMMARY OF THE INVENTION

It is the task of the present invention to further develop torque-measuring shafts of the class in question so that they can deliver reliable measured values operationally safely even under rapidly rotating load and also under extremely poor operating conditions.

The task of the invention is accomplished by a torque-measuring shaft comprising a measuring shaft disposed on a shaft axis of the torque-measuring shaft, loadable in torsion and having at least one rotationally symmetric surface region disposed coaxially with the shaft axis as well as measuring means disposed on the measuring shaft for measuring a torsion of the measuring shaft, wherein the torque-measuring shaft is characterized according to the invention by a material weakening disposed in radial direction inside the measuring shaft, eccentrically relative to the shaft axis.

Because the material weakening is located inside the measuring shaft, no additional sealing elements are needed either on the external rotationally symmetric outer surface of the measuring shaft or on the internal rotationally symmetric inner surface, if the measuring shaft is a hollow shaft. In this respect the measuring shaft is absolutely leak-tight on the rotationally symmetric surfaces. As a result, no contaminants can penetrate into the material weakening from the direction of the rotationally symmetric surface regions of the measuring shaft.

Particularly in gearbox-measuring stands or the like, more copious contaminants can often be expected.

In contrast, a cover mounted on these head ends can be structurally retained simply and reliably on the measuring shaft, even at high speeds of the torque-measuring shaft.

In this connection, the present material weakening can be machined approximately axially from the direction of the head ends of the measuring shaft into the measuring shaft without problems. For example, the material weakening can be produced inside the measuring shaft by means of a laser method, an erosion method or the like.

In this connection the head end of the measuring shaft forms the axial end of the measuring shaft. It is oriented preferably perpendicularly relative to the shaft axis of the torque-measuring shaft.

The head ends of the measuring shaft correspond to the end faces of the torque-measuring shaft.

The material weakening disposed in the sense of inside the measuring shaft is directed preferably into the measuring shaft, beginning approximately from the first head end of the measuring shaft and preferably through the measuring shaft up to a second head end of the measuring shaft opposite the first head end.

The measuring shaft used in the present case is preferably cylindrically shaped, whereby it can be structurally provided unproblematically.

Further advantageous configurations, which as the case can be are also independent of the above embodiments, are discussed below.

The torque-measuring shaft can be structurally realized very simply when the material weakening comprises, in the measuring shaft, at least one recess disposed in radial direction inside the measuring shaft, eccentrically relative to the shaft axis.

In the simplest case this recess can be a bore, a scooped-out depression, an eroded recess or the like, which extends through the measuring shaft in the direction of the shaft axis.

Furthermore, it is advantageous when a stiffening element is disposed in the recess. Hereby the behavior of the recess and in particular also of the material weakening can be influenced selectively under torque. The stiffening element can be preferably disposed opposite the material weakening, so that any stress variations in the material weakening can be concentrated hereby.

In particular, it is conceivable that the stiffening element comes into contact with the rims of the recess under torsion. Hereby the measuring shaft can be automatically stiffened under a torsion, so that larger torques acting on the torque-measuring shaft can also be absorbed by the measuring shaft.

Preferably the contact faces between the stiffening element and the rims of the recess or material weakening are respectively convex. In this way, an extremely favorable force distribution and as the case may be a contact profile as jerk-free as possible can be achieved, as will still be explained later.

It will be understood that the stiffening element can be realized in different ways. For example, it is configured as a bar element that can be inserted from axial direction into the recess.

Particularly good stiffening effects and force variations can be achieved when the stiffening element is formed in one piece with the measuring shaft.

Furthermore, it is advantageous when the recess perforates the measuring shaft. This feature permits a particularly simple structure of the arrangement, which in particular can also withstand high speeds of rotation.

If in this connection the recess traverses the measuring shaft especially parallel to the shaft axis, on the one hand the torque-measuring shaft can be constructively realized simply, because the exact position of any measured-value transducer is not quite so critical. On the other hand, the measured results can be analyzed or reproduced very simply.

In order, on the other hand, to be able in particular to realize various measuring sensitivities on the torque-measuring shaft, the recess can in contrast also be aligned askew or at an angle relative to the shaft axis.

The recess can be effectively protected against external influences, such as contaminants, for example, when the recess is provided with a cover on at least one end, preferably on both ends of the measuring shaft.

Within the meaning of the invention, a cap element completely covering the head end of the measuring shaft, a cap element disposed inside a shouldered ring on the end face, a stopper part inserted into the respective recess or the like, for example, can be used as the cover, depending on how the torque-measuring shaft is specifically configured.

Furthermore, it is advantageous when the material weakening is convex in the direction of the rotationally symmetric surface region. In this way, a particularly uniform force intensification relative to the cylindrical surface region can be achieved at the apex of a corresponding convexity.

Advantageously a measuring web, which has a minimum width perpendicular to its axial alignment parallel to the shaft axis and starting therefrom broadens steadily, preferably also in steady second-order manner, up to a circumferential extent of the recess, i.e. up to a maximum extent of the recess in circumferential direction of the torque-measuring shaft, is disposed between the material weakening and the rotationally symmetric surface region.

Furthermore, this measuring web preferably extends further over the entire radial thickness of the measuring shaft, which as the case may be signifies a discontinuity or a kink, i.e. a first-order discontinuity, at the circumferential extent of the recess, albeit then in large and therefore uncritical depth.

By a steady transition to a specified depth, force peaks in the case of uniform force distribution can be concentrated at the center of the measuring web.

Because of the convex material weakening in direction of rotation of the measuring shaft, it is therefore constructively simple for the measuring web to have a variable cross section. This measuring web structured in such a manner is ideally disposed between the material weakening and the strain gauges.

Expediently, the measuring web is formed in one piece with the measuring shaft, so that the production of the torque-measuring shaft can be achieved simply on the whole and any force peaks at undesired places can be avoided.

In order to make the measuring sensitivity of the present torque-measuring shaft even more precise, a preferred alternative embodiment provides at least two, preferably at least four material weakenings disposed in radial direction inside the measuring shaft, respectively eccentrically relative to the shaft axis and mutually symmetrically relative to the shaft axis.

If the material weakenings are respectively identically configured, on the one hand the measuring shaft can be produced structurally more simply. On the other hand, a measuring shaft configured rotationally symmetrically in this respect offers measured values that are less laborious to evaluate as well as the possibility of comparing several measured values with one another.

The number of components of the torque-measuring shaft and thus also their constructive complexity can be further reduced when the measuring shaft is formed in one piece.

Measuring-shaft torsions on the present torque-measuring shaft can be constructively measured simply and precisely when the measuring means comprise strain gauges.

Cumulatively or alternatively in this respect, the measuring means can be mounted on the rotationally symmetric surface region, preferably in the region of the material weakenings or of the measuring web. This arrangement also makes it possible to measure correspondingly simply and precisely.

For example, the strain gauges are mounted radially further outward or inward in the region of the material weakenings.

Ideally, the strain gauges are mounted on the respective measuring web.

The present torque-measuring shaft may be actively connected in different ways with rotating components. The torque-measuring shaft can be structurally integrated particularly simply and reliably in a high-speed train of components rotating at a corresponding high frequency when a flange is attached to or is formed in one piece with this measuring shaft on at least one end, preferably on both ends of the measuring shaft.

In this respect the present invention relates especially to a rotationally symmetric torque-measuring shaft, which is designed for high speeds of revolution around its shaft axis. In this respect, torsion measurements can be undertaken during the rotation of the torque-measuring shaft, wherein the present torque-measuring shaft can rotate with a speed, for example, between 500 rpm and 20,000 rpm during a measurement. In this respect, the torque-measuring shaft described here is suitable in particular for stationary use on a gearbox-measuring stand or the like.

BRIEF DESCRIPTION OF THE DRAWINGS

Further advantages, objectives and properties of the present invention will be explained on the basis of the following description of exemplary embodiments, which in particular are also illustrated in the attached drawing, wherein.

DETAILED DESCRIPTION OF PREFERRED EMBODIMENTS

Figure 1:
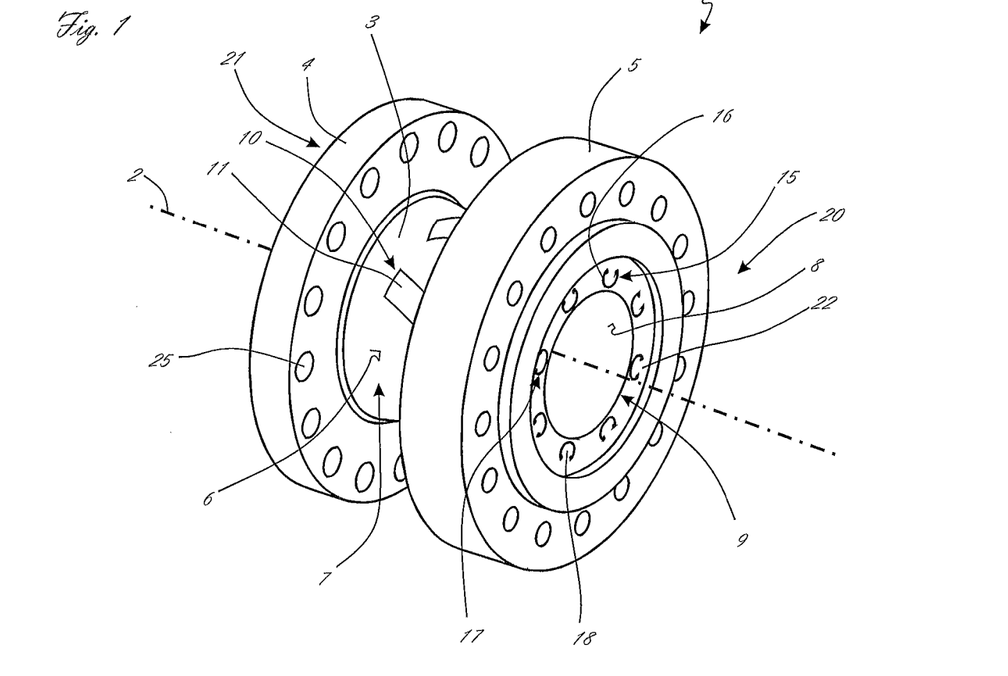
FIG. 1 schematically shows a perspective view of a torque measuring shaft with a multiplicity of material weakenings disposed in radial direction inside the measuring shaft, eccentrically relative to the shaft axis, and strain gauges disposed radially outwardly.
Figure 2:
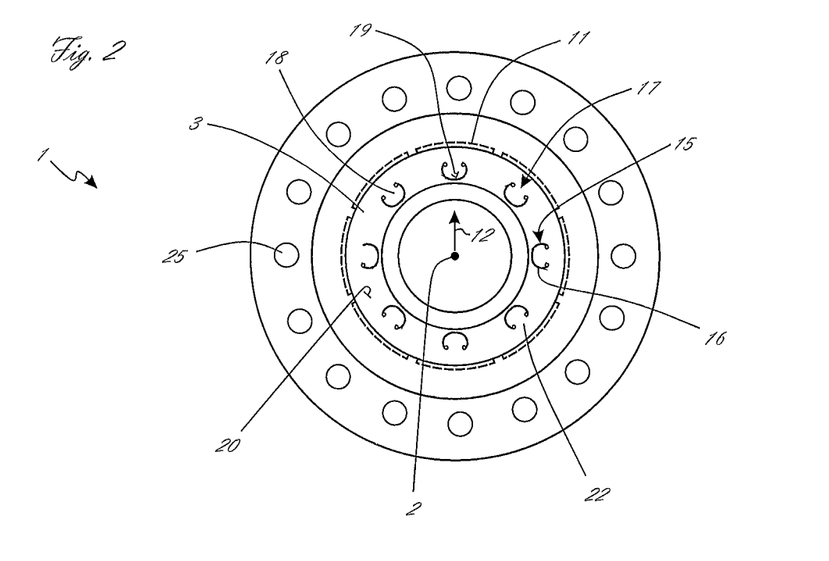
FIG. 2 schematically shows a side view of the torque-measuring shaft from FIG. 1.

The torque-measuring shaft 1 shown in FIGS. 1 and 2 rotates on the whole around a shaft axis 2. The torque-measuring shaft 1 has a measuring shaft 3, which extends along this shaft axis 2, is loadable in torsion and spaces apart from one another first and second connecting flanges 4 and 5 of the torque-measuring shaft 1, by means of which the torque-measuring shaft 1 can be mounted, for example, in a rapidly rotating drive train (not shown) or the like. The shaft axis 2 is therefore simultaneously the axis of rotation (not separately numbered) of the torque-measuring shaft 1. The measuring shaft 3 is formed in one piece in itself and in one piece with the two connecting flanges 4, 5.

Furthermore, the measuring shaft 3 has on the one hand an external rotationally symmetric surface region 6, which is also described in general as shell surface 7. On the other hand, the measuring shaft 3 has an internal rotationally symmetric further surface region 8.

In this respect, the present measuring shaft 3 of this exemplary embodiment is formed as a hollow shaft 9. In an alternative embodiment, however, it can also be formed monolithically as a solid shaft if necessary.

In this first exemplary embodiment, the measuring means 10 for measuring a torsion of the measuring shaft 3 are mounted on the external rotationally symmetric surface region 6 in the form of in total eight strain-gauge elements 11 (see also FIG. 2 in particular, numbered only as an example). Relative to the shaft axis 2, these measuring means 10 are disposed radially further outward on the measuring shaft 3 in radial direction 12 (shown only as an example here).

The torque-measuring shaft 1 is characterized in particular in that in total eight identically configured material weakenings 15 (numbered only as an example, see also FIG. 2 in particular) are disposed inside the measuring shaft 3, eccentrically relative to the shaft axis 2, wherein these material weakenings 15 extend in radial direction 12 inside the measuring shaft 3.

In this connection the material weakenings 15 are disposed in such a way inside the measuring shaft 3 that they lie underneath the rotationally symmetric surface regions 6 and 8 respectively. In other words, the material weakenings 15 do not perforate the rotationally symmetric surface regions 6 and 8 respectively. To the contrary, these rotationally symmetric surface regions 6 and 8 respectively are untouched by the material weakenings 15, and so they are formed with a continuously closed surface.

The material weakenings 15 respectively comprise at least one recess 16 disposed in radial direction 12 inside the measuring shaft 3, eccentrically relative to the shaft axis 2.

And, in fact, the recess 16 or the material weakening 15 associated therewith is formed convexly in the direction of the rotationally symmetric surface region 6 and 8 respectively.

The recess 16 or the material weakening 15 associated therewith is produced as an arc-shaped slit 17 in such a way that, because of the arc shape of the slit 17, a stiffening element 18, which comes into contact with the arc-shaped rim 19 of the recess 16 or the material weakening 15 associated therewith under torsion of the measuring shaft 3, so that hereby a stiffening of the measuring shaft 3 initiated by the torsion can be achieved, is formed from the measuring shaft 3.

In this respect, the recess 16 or the material weakening 15 associated therewith inside the measuring shaft 3 also extends in U-shape from the internal rotationally symmetric further surface region 8 to the external rotationally symmetric surface region 6.

The stiffening element 18 in the present case is therefore formed in one piece with the measuring shaft 3.

In this connection, the recess 16 and the material weakening 15 associated therewith extend parallel to the shaft axis 2 and perforate the measuring shaft 3 from a first end 20 of the measuring shaft 3 to a second end 21 of the measuring shaft 3, wherein the first end 20 lies at the first end face (not additionally numbered) of the torque-measuring shaft 1 and the second end 21 lies at the second end face (not additionally numbered) of the torque-measuring shaft 1.

Because the recess 16 and the material weakening 15 associated therewith perforate the measuring shaft 3 only at its ends 20 and 21 and not at its rotationally symmetric surface regions 6 or 8, the recess 16 and the material weakening 15 associated therewith can be or are covered by a cover (not shown here) mountable simply on the torque-measuring shaft 1. Thus the recess 16 or the material weakening 15 associated therewith can be protected very effectively from external influences, such as liquids, dust or the like. Furthermore, the respective cover at the ends 20 and 21 can be retained very securely, so that it is fixed operationally safely to these ends even at very high speeds of revolution of the torque-measuring shaft 1.

Above and beyond this arrangement, a measuring web 22, which is disposed between the recess 16 or the material weakening 15 associated therewith and the strain-gauge element 11 located closest radially further outward, is formed between the recess 16 and the material weakening 15 associated therewith.

In this first exemplary embodiment, the measuring web 22 merges by material bonding into the stiffening element 18, so that the measuring web 22 and the stiffening element 18 are formed in one piece.

The two connecting flanges 4 and 5 also have several connecting bores 25, which are disposed concentrically around the shaft axis 2, through which screws or the like can be inserted and/or screwed in, in order to be able to fasten the torque-mesuring shaft 1 to components, not shown here, of the drive train or the like mentioned in the foregoing.

Figure 3:
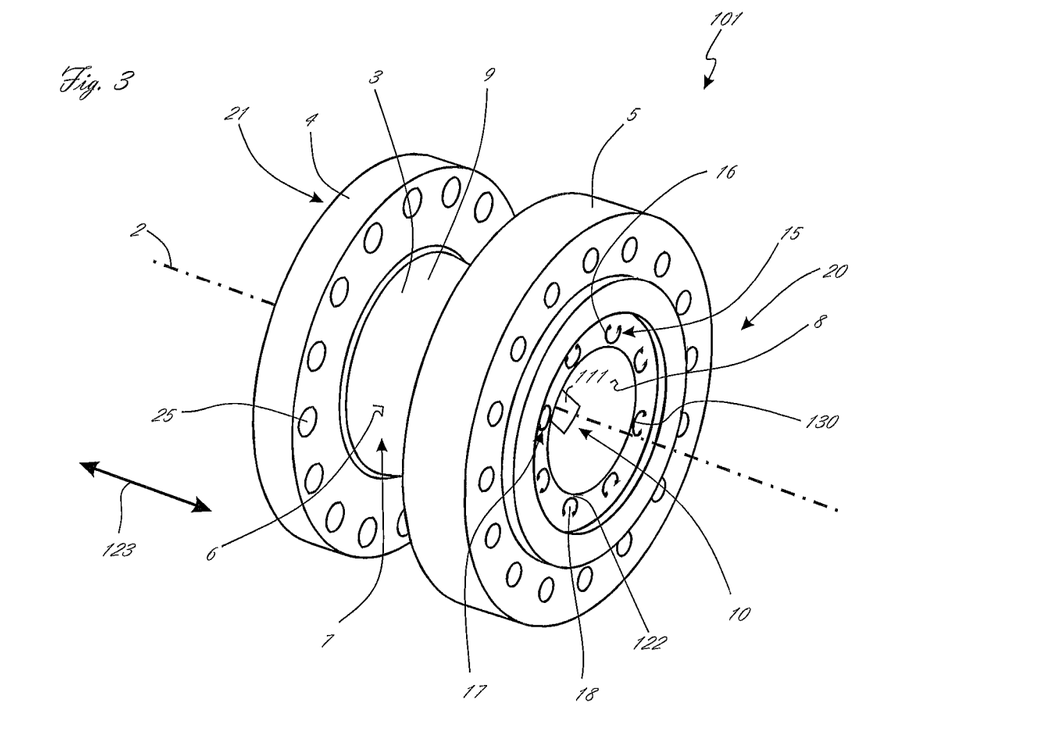
FIG. 3 schematically shows a perspective view of a torque-measuring shaft with a multiplicity of material weakenings disposed in radial direction inside the measuring shaft, eccentrically relative to the shaft axis, and strain gauges disposed radially inwardly.
Figure 4:
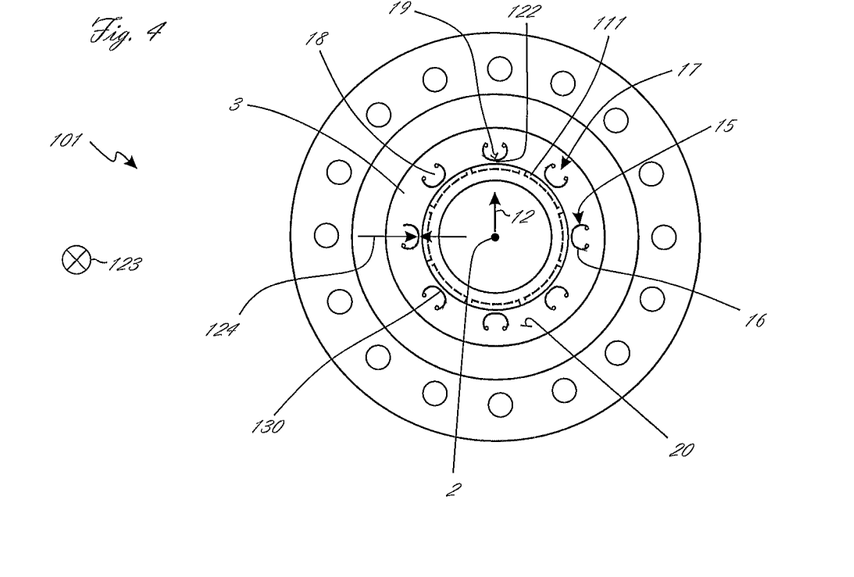
FIG. 4 schematically shows a side view of the torque-measuring shaft from FIG. 3.

The further torque-measuring shaft 101 shown in FIGS. 3 and 4 is substantially structurally identical to the torque-measuring shaft shown in FIGS. 1 and 2 and described in the foregoing, but because of measuring webs 122 formed in filigree the further torque-measuring shaft 101 has a higher measuring sensitivity than the torque-measuring shaft 1. Because of the structural identicality of these two torque-measuring shafts 1 and 101, essentially only the different features, which are denoted by reference numerals expanded by 100, will still be described in the following, in order hereby to avoid repetitions.

The respective filigreed measuring web 122 of the torque-measuring shaft 101 is constructively achieved particularly simply in that the measuring means 10 are mounted not on the external rotationally symmetric surface region 6 but on the internal rotationally symmetric surface region 8.

In this connection, these measuring means 10, because of the smaller internal rotationally symmetric surface region 8, are configured by correspondingly smaller strain-gauge elements 111. This location of the mounting on the internal rotationally symmetric surface region 8 additionally has the further advantage that the strain-gauge elements 111 positioned there are pressed increasingly more strongly on the adhesive base, in other words the internal rotationally symmetric surface region 8, with increasing speed of revolution of the torque-measuring shaft 101, whereby the danger of inadvertent detachment of the measuring means 10 is suppressed particularly effectively in this second exemplary embodiment.

Thus the more narrowly structured measuring web 122, which has a minimum width 124 perpendicular to its axial alignment 123 parallel with the shaft axis 2 and starting therefrom broadens steadily up to a radial extent of the recess 16 or the material weakening 15 associated therewith, is now located between the material weakening 15 and the internal rotationally symmetric surface region 8, on which the smaller strain-gauge elements are arrayed.

In this respect the measuring web 122 formed by the measuring shaft 3 between the recess 16 or the material weakening 15 associated therewith, starting from the apex 130 of the convex recess 16 or the material weakening 15 associated therewith, is broadened steadily in radial direction to the strain-gauge elements 111 on both sides of the apex 130. Hereby a torque-measuring shaft 101 with a particularly high measuring sensitivity can be constructively produced simply.

In any case, in both exemplary embodiments, the measuring means 10 or the strain-gauge elements 11 or 111 associated therewith are mounted in the region of the material weakenings 15 or of the measuring web 22 (thick) or 122 (thin) on the respective rotationally symmetric surface region 6 or 8.

It is particularly advantageous in the present structurally identical torque-measuring shafts 1 and 101 that two different measuring sensitivities can be achieved with a single basic construction of the torque-measuring shafts 1 and 101 merely by a simple repositioning of measuring means 10.

In this connection, exactly one strain-gauge element 11 or 111 respectively is assigned to each recess 16 or to each material weakening 15 associated therewith.

It will be understood that, in an exemplary embodiment not shown here, corresponding measuring means 10 can be disposed both on the external rotationally symmetric surface region 6 and on the internal rotationally symmetric surface region 8.

The recess 16 in this exemplary embodiment is produced by means of spark erosion, which has proved particularly advantageous, in order to produce an axially oriented recess by. means of a filigreed slit 17, so that the stiffening element 18 can also be produced directly. In alternative manufacturing processes, other ablation or erosion methods, such as laser erosion, for example, can also be employed.

The filigreed slit 17, by which recess 16 and stiffening element 18 are produced, permits the stiffening element 18 to come into contact with the opposite rim at very high torsions, so that a larger measuring range can be sensed. In alternative embodiments, however, this arrangement is not absolutely necessary, and as the case may be it is possible to dispense with contact between stiffening element 18 and the opposite rim even at high torques, wherein the stiffening element 18 then still continues to act in stiffening manner. In this respect, the slit 17 can also be made substantially broader if necessary.

On the other hand, it is also conceivable to dispense with the stiffening element 18. Likewise it is conceivable to reverse the alignment of the slit 17, the arc shape of which opens radially outwardly in the exemplary embodiments illustrated here, so that a thin measuring web can be produced radially outwardly, which can prove advantageous especially in the first exemplary embodiment according to FIGS. 1 and 2. Likewise it is conceivable to configure the slits 17 or the recesses 16 and/or the stiffening elements 18 differently in circumferential direction, in order to be able to realize different measuring regions in this way.

It will be further understood that the exemplary embodiment explained in the foregoing constitutes merely exemplary configurations of the torque-measuring shaft according to the invention. In this respect, the configuration of the invention is not limited to these exemplary embodiments.

What is claimed is:

1. A torque-measuring shaft comprising:
    (a) a shaft axis;
    (b) measuring shaft disposed on the shaft axis, loadable in torsion and having at least one rotationally symmetric surface region disposed coaxially with the shaft axis;
    (c) a measuring device disposed on the measuring shaft for measuring a torsion of the measuring shaft;
    (d) a material weakening disposed in a radial direction inside the measuring shaft eccentrically relative to the shaft axis; and
    (e) a stiffening element;
    wherein the material weakening comprises, in the measuring shaft, at least one recess disposed in the radial direction inside the measuring shaft eccentrically relative to the shaft axis;
    wherein the stiffening element is disposed in the at least one recess;
    wherein the at least one recess has rims; and
    wherein the stiffening element comes into contact with the rims of the at least one recess.

2. The torque-measuring shaft according to claim 1, wherein the stiffening element comes into contact with the rims under torsion.

3. The torque-measuring shaft according to claim 1, wherein the stiffening element is formed in one piece with the measuring shaft.

4. The torque-measuring shaft according to claim 1, wherein the at least one recess perforates the measuring shaft.

5. The torque-measuring shaft according to claim 4, wherein the at least one recess perforates the measuring shaft parallel to the shaft axis.

6. The torque-measuring shaft according to claim 1, wherein at least one recess is provided with a cover on at least one end of the measuring shaft.

7. The torque-measuring shaft according to claim 1, wherein the at least one recess is provided with first and second cover on first and second ends, respectively, of the measuring shaft.

8. The torque-measuring shaft according to claim 1, further comprising a measuring web disposed between the material weakening and the at least one rotationally symmetric surface region, wherein the measuring web has a minimum width perpendicular to an axial alignment of the measuring Web to the shaft axis and starting from the shaft axis broadens steadily up to a radial extent of the at least one recess.

9. The torque-measuring shaft according to claim 8, wherein the measuring web is formed in one piece with the measuring shaft.

10. The torque-measuring shaft according to claim 8, comprising at least two material weakenings disposed in the radial direction inside the measuring shaft, respectively eccentrically relative to the shaft axis and mutually symmetrically relative to the shaft axis.

11. The torque-measuring shaft according to claim 8, comprising at least four material weakenings disposed in the direction inside the measuring shaft, respectively eccentrically relative to the shaft axis and mutually symmetrically relative to the shaft axis.

12. The torque-measuring shaft according to claim 10, wherein the material weakening are respectively identically configured.

13. The torque-measuring shaft according to claim 1, wherein the measuring shaft is formed in one piece.

14. The torque-measuring shaft according to claim 10, wherein the measuring device comprises a plurality of strain gauges.

15. The torque-measuring shaft according to claim 10, wherein the measuring device, is mounted on the at least one rotationally symmetric surface region.

16. The torque-measuring shaft according to claim 14, wherein the strain gauges are disposed near the material weakenings or the measuring web.

17. The torque-measuring shaft according to claim 15, wherein the measuring device is mounted on the at least one rotationally symmetric surface region near the material weakenings or the measuring web.

18. The torque-measuring shaft according to claim 1, further comprising a flange attached to or formed in one piece with the measuring shaft on at least one end of the measuring shaft.

19. The torque-measuring shaft according to claim 1, further comprising first and second flanges attached to or formed in one piece with the measuring shaft on first and second ends, respectively, of the measuring shaft.

20. A torque-measuring shaft comprising:
    (a) a shaft axis;
    (b) a measuring shaft disposed on the shaft axis, loadable in torsion and having at least one rotationally symmetric surface region disposed coaxially with the shaft axis;

(c) a measuring device disposed on the measuring shaft for measuring a torsion of the measuring shaft; and (d) a material weakening disposed in a radial direction inside the measuring shaft eccentrically relative to the shaft axis;

wherein the material weakening is convex in a direction of the at least one rotationally symmetric surface region.

21. The torque-measuring shaft according to claim 20, wherein the measuring shaft is formed in one piece.

22. The torque-measuring shaft according to claim 20, further comprising a flange attached to or formed in one piece with the measuring shaft on at least one end of the measuring shaft.

23. A torque-measuring shaft comprising:

(f) a shaft axis;

(g) a measuring shaft disposed on the shaft axis, loadable in torsion and having at least one rotationally symmetric surface region disposed coaxially with the shaft axis;

(h) a measuring device disposed on the measuring shaft for measuring a torsion on of the measuring shaft; and (i) a material weakening disposed in a radial direction inside the measuring shaft eccentrically relative to the shaft axis;

wherein the material weakening comprises, in the measuring shaft, at least one recess disposed in the radial direction inside the measuring shaft eccentrically relative to the shaft axis; and wherein the at least one recess perforates the measuring shaft parallel to the shaft axis.

24. The torque-measuring shaft according to claim 23, wherein the material weakening is convex in a direction of the at least one rotationally symmetric surface region.

25. The torque-measuring shaft according to claim 23, wherein the measuring shaft is formed in one piece.

\* \* \* \* \*

UNITED STATES PATENT AND TRADEMARK OFFICE
CERTIFICATE OF CORRECTION

PATENT NO.         : 9,612,171 B2
APPLICATION NO.    : 14/933222
DATED              : April 4, 2017
INVENTOR(S)        : Meuter et al.

Page 1 of 1

It is certified that error appears in the above-identified patent and that said Letters Patent is hereby corrected as shown below:

In the Claims

In Column 10, Line 8, (Claim 6) after the word "wherein" please insert: -- the --.

In Column 10, Line 12, (Claim 7) please change "cover" to correctly read: -- covers --.

In Column 10, Line 20, (Claim 8) please change "Web" to correctly read: -- web parallel --.

In Column 10, Line 37, (Claim 12) please change "weakening" to correctly read: -- weakenings --.

Signed and Sealed this
Sixteenth Day of May, 2017

Michelle K. Lee
*Director of the United States Patent and Trademark Office*